United States Patent
Sun et al.

(10) Patent No.: US 10,585,841 B2
(45) Date of Patent: Mar. 10, 2020

(54) COMMON HIGH SPEED IO CALIBRATION ENGINES

(71) Applicant: International Business Machines Corporation, Armonk, NY (US)

(72) Inventors: Xu Guang Sun, Beijing (CN); Yang Xiao, Beijing (CN); Xiao Di Xing, Beijing (CN); Zhen Peng Zuo, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/043,484

(22) Filed: Jul. 24, 2018

(65) Prior Publication Data
US 2020/0034328 A1  Jan. 30, 2020

(51) Int. Cl.
G06F 13/42 (2006.01)
G06F 13/40 (2006.01)
H04L 25/03 (2006.01)

(52) U.S. Cl.
CPC ...... *G06F 13/4278* (2013.01); *G06F 13/4004* (2013.01); *H04L 25/03057* (2013.01)

(58) Field of Classification Search
CPC ......... H04L 25/03057; H04L 25/03885; H04L 25/03343; H04L 25/03038; H04L 25/03267; H04L 2025/0349
See application file for complete search history.

(56) References Cited

U.S. PATENT DOCUMENTS

| | | |
|---|---|---|
| 8,482,293 B2 | 7/2013 | Tyan et al. |
| 9,048,249 B2 | 6/2015 | Hsu et al. |
| 9,275,706 B2 | 3/2016 | Tam |
| 9,367,385 B2 * | 6/2016 | Cyrusian ........... H04L 25/03057 |
| 9,472,246 B2 | 10/2016 | Priel et al. |
| 9,628,302 B2 * | 4/2017 | Francese ........... H04L 25/03057 |
| 9,666,245 B2 * | 5/2017 | Arai ...................... G11C 29/021 |
| 10,070,385 B2 * | 9/2018 | Chakraborty ..... H04W 52/0229 |
| 10,097,396 B2 * | 10/2018 | Sestok, IV ............ H04L 27/364 |

(Continued)

OTHER PUBLICATIONS

Filipe M. Barradas; Telmo R. Cunha; José C. Pedro "Setup and Calibration Procedure for LPE PA Characterization With Synchronous Input-Output Excitations", Aug. 8, 2017.

*Primary Examiner* — Brian T Misiura
(74) *Attorney, Agent, or Firm* — Patterson + Sheridan, LLP (57) ABSTRACT

Techniques and systems for performing calibration. A method includes: creating a common calibration pool for performing a calibration operation for two or more communication links, wherein the calibration operation is common to the two or more communication links; and performing a calibration on each of the two or more communication links using the common calibration pool by receiving a calibration request associated with the common calibration operation via a link calibration interface, wherein the calibration request is from at least one of the two or more communication links, upon determining the calibration agent is available to handle the calibration request, retrieving a calibration engine from at least one of the plurality of calibration clusters corresponding to the calibration operation, retrieving a calibration engine from at least one of the plurality of calibration clusters corresponding to the calibration operation, and performing the common calibration based on the retrieving.

20 Claims, 5 Drawing Sheets

(56) References Cited

U.S. PATENT DOCUMENTS

2002/0199141 A1* 12/2002 Lemlein .......... G01R 31/31922
 714/724
2015/0333753 A1 11/2015 Chen et al.

* cited by examiner

COMMON HIGH SPEED IO CALIBRATION ENGINES

BACKGROUND

The present invention relates to digital data processing and in particular to the design and operation of communications circuit interfaces for pooling calibration resources.

The increased clock frequencies of processors and other digital data components have induced designers to increase the speeds of bus clocks in order to prevent transmission buses from becoming a bottleneck to performance. This has caused various design changes to the buses themselves. For example, a high-speed bus is typically implemented as a point-to-point link containing multiple lines in parallel, each carrying data from a single transmitting chip to a single receiving chip, in order to support operation at higher bus clock speeds.

In order to support inter-chip data transfer at high bus clock speeds, the lines of a data communications bus can be individually calibrated to compensate for these and other variations.

SUMMARY

According to one embodiment of the present disclosure, a method is provided. The method includes: creating a common calibration pool for performing a calibration operation for two or more communication links, wherein the calibration operation is common to the two or more communication links; and performing a calibration on each of the two or more communication links using the common calibration pool.

Another embodiment of the present disclosure includes another method. The method includes: creating a common calibration pool for performing a calibration operation for two or more communication links, wherein the calibration operation is common to the two or more communication links, and performing a calibration on each of the two or more communication links using the common calibration pool by receiving a calibration request associated with the common calibration operation via a link calibration interface, wherein the calibration request is from at least one of the two or more communication links, upon determining the calibration agent is available to handle the calibration request, retrieving a calibration engine from at least one of the plurality of calibration clusters corresponding to the calibration operation, and performing the common calibration based on the retrieving of the calibration engine.

Yet another aspect of the present disclosure includes a system. The system includes: one or more physical logic units each associated with two or more communication links, wherein the one or more physical logic units are configured to create a plurality of calibration engine clusters corresponding to one or more common calibration operations required along the two or more communication links, and a calibration unit configured i) to interface with the two or more communication links and ii) to calibrate according to the one or more common calibration operations using the plurality of calibration engine clusters.

Yet another aspect of the present disclosure includes a computer program product. The computer program product includes: a computer program product for calibrating each one of one or more common digital operations, where the one or more common digital operations are common to two or more communications links in a computing environment, the computer program product including a computer-readable storage medium having computer-readable program code embodied therewith, the computer-readable program code executable by one or more computer processors to: create a common calibration pool for performing one or more calibration operations along two or more communication links, where each of the one or more calibration operations is common to the two or more communication links, and performing a calibration on each of the two or more communication links using the common calibration pool.

Yet another aspect of the present disclosure includes another computer program product. The computer program product includes: a computer program product for calibrating each one of one or more common digital operations, wherein the one or more common digital operations are common to two or more communications links in a computing environment, the computer program product comprising: a computer-readable storage medium having computer-readable program code embodied therewith, the computer-readable program code executable by one or more computer processors to: create a common calibration pool for performing a calibration operation for two or more communication links, wherein the calibration operation is common to the two or more communication links, and perform a calibration on each of the two or more communication links using the common calibration pool by receive a calibration request associated with the common calibration operation via a link calibration interface, wherein the calibration request is from at least one of the two or more communication links, determine whether a calibration agent corresponding to the calibration operation is available to handle the calibration request, upon determining the calibration agent is available, retrieving a calibration engine from at least one of the plurality of calibration clusters corresponding to the calibration operation, and perform the common calibration based on the retrieving of the calibration engine.

DETAILED DESCRIPTION

One aspect of the present disclosure relates to high-speed communication interfaces, including high-speed Input/Output (10) bus interfaces for integrated circuits and to calibration of such interfaces. High-performance data processing applications (e.g., data analytics, high performance computing and machine learning, etc.) are driving the demand for data rates, e.g. up to the tens of Giga-Hertz.

There are many high-speed IO interfaces instantiated (by both type and number) on one chip and even more in a system which is built with one or more chips. From the perspective of a single chip, the more instances of use increases cost, area and power consumption, and likewise for an overall system. One or more embodiments of the present disclosure provides a method to reduce cost/area, power consumption, and complexity by sharing one or more common high-speed IO calibration engines among different high-speed I/O operations and instances, even when the operations and/or instances are different.

In one or more types of high-speed IO bus interfaces, the Physical Media Attachment (PMA) unit is used to convert data between serial data for an external IO and parallel data for internal logic and independent on top-level protocol item(s). In one embodiment, at both a transmitter and a receiver circuit of a PMA, calibration is used to make sure the correct electrical signal can be received through the physical channel/lane on a Printed Circuit Board (PCB), cable, or other suitable communication medium. On the transmitter side, the calibration may include one or more operations and modules for performing the same operation on particular analog operations, e.g. impendence calibration, feed forward equalization (FFE), duty cycle adjustment (DCA), etc. On the receiver side, the calibration may include one or more operations and modules for performing the same, e.g. low frequency equalization (LFE), variable gain adjustment (VGA), continuous time linear equalization (CTLE), decision feedback equalization (DFE), sampling, etc.

Each calibration block can be divided into the analog part and the digital part. The analog part can be used for bit stream processing at channel/lane speed level and operates on both calibration mode and function mode, and as such, it is a per-lane circuit. The analog part is controlled by the corresponding digital calibration engine. The digital calibration engines operate on a low frequency and are shared by all the lanes in a single bus interface instance, e.g. per-bus logic. The digital calibration engines can be shared because calibration is not necessarily continuous, e.g. calibration is only needed periodically and in a particular calibration mode and/or digital operation. For example, in a function mode, normal data is transmitted through the lane, while the digital calibration engines are idle.

In one type of design, each high-speed IO bus interface instance has one set of its own digital calibration engines. In a function mode, these digital calibration engines are idle, but they still have power consumption even within a low power mode, as such, this consumes unnecessary area and/or energy. At least one embodiment of the present disclosure proposes a common calibration engines pool to address this and other concerns. Each high-speed IO bus interface instance can request the digital calibration engines in the pool as needed during a respective calibration period. Each interface instance can select and configure the proper digital calibration engines based on its interface type and optimization information. The granularity of the calibration request can be per-lane, even though the multiple calibration requests are from the same bus interface at the same time. This feature gives enormous freedom for each bus interface instance to have its own algorithm for calibration and calibration scheduling, especially for high data rates.

Figure 1:
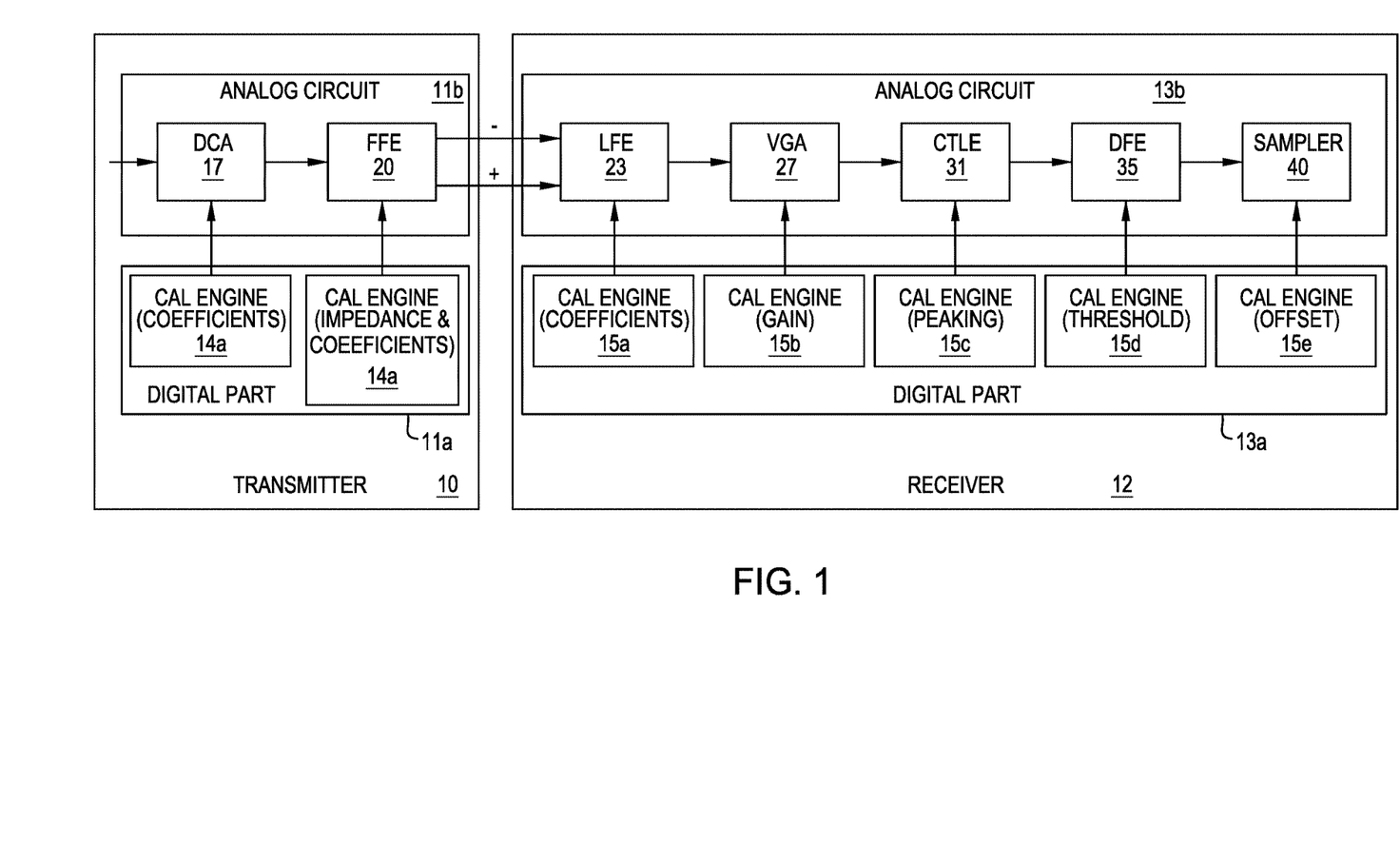
FIG. 1 illustrates a system that can be calibrated according to at least one embodiment of the present disclosure.

FIG. 1 illustrates an exemplary system, bus line, or communication link ("bus line," "bus," "bus instance," and "communication link" are used interchangeably herein, even though the term "communication link" captures a broader set of communication channels, one type of which is a "bus," "bus instance" or "bus line") that can be calibrated according to at least one embodiment of the present disclosure. The system includes a transmission circuit 10 and a receiver circuit 12. The transmitter circuit 10 includes an analog circuit 11b and a digital portion 11a, including modules for calibrating associated operations and/or modules of the analog circuit 11b. The transmitter 10 includes a DCA module 17 for performing a DCA operation, which is associated with calibration module 14a. The transmitter 10 further includes a FFE module 20 for performing an FFE operation, which is associated with calibration module 14b. The receiver 13a also includes a digital part 13a and an analog part 13b. The analog part 13a includes LFE module 23, VGA module 27, CTLE module 31, DFE module 35, and sampler 40, each of which is associated with a particular analog operation, e.g. LFE, VGA, CTLE, DFE, and sampling, and each of which being associated with a digital module, respectively, 15a, 15b, 15c, 15d, and 15e. The term "module" refers to a particular set of hardware (logic) or software instructions configured to execute the particular operation at issue. In one embodiment, a transmitter 10 and a receiver 12 can be used where each is an individual integrated circuit or system, or where each can be one or more integrated circuits. In one embodiment, the transmitter and receiver are connected by a communication link, wireless connection, or hard line connection that is distinct form the communication links associated with calibration, and in another embodiment (not shown) one or more of the bus lines associated with the modules requiring calibration can directly connect the two units.

Figure 2:
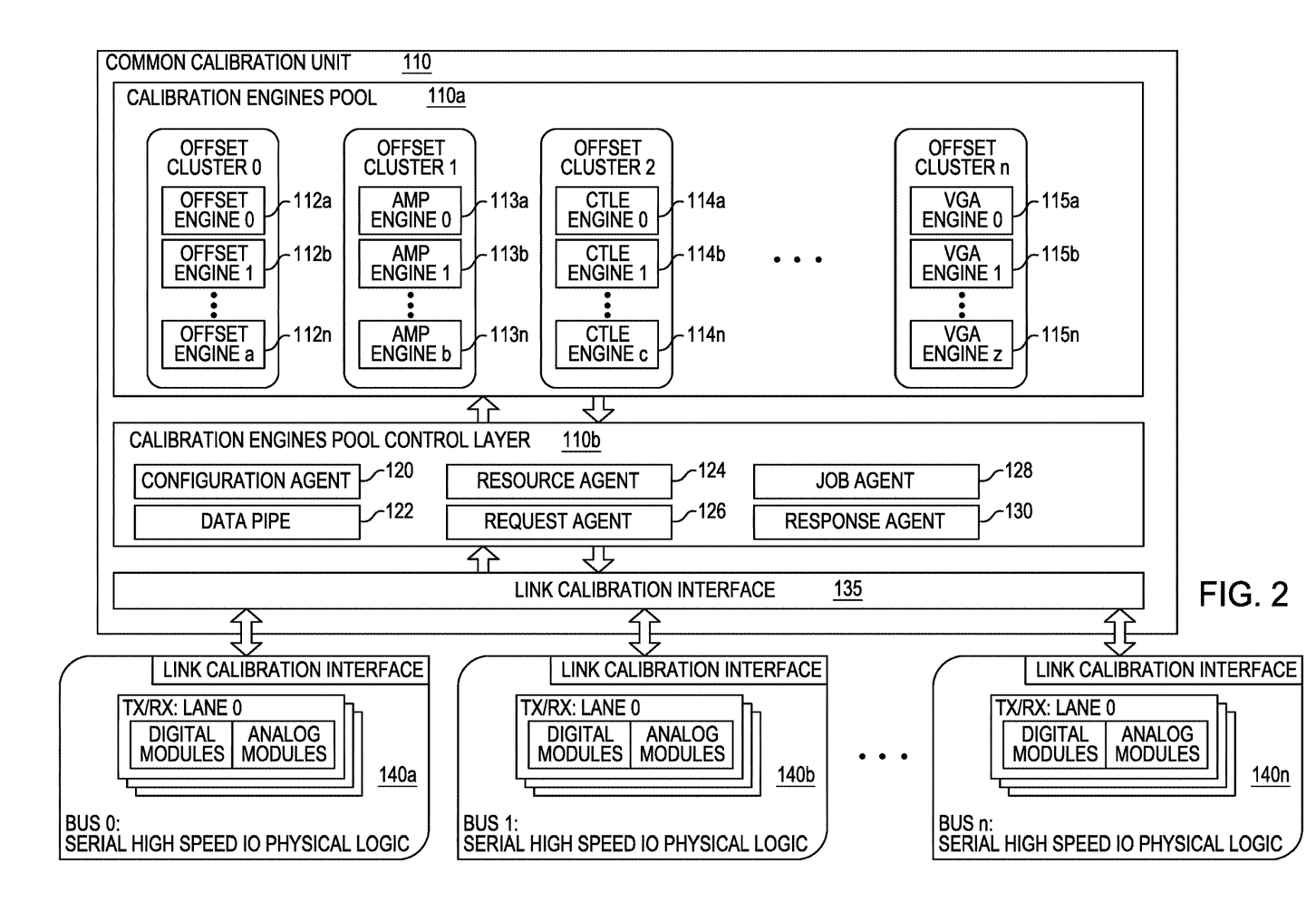
FIG. 2 illustrates a system for pooling operations and for calibration according to at least one embodiment of the present disclosure.

FIG. 2 illustrates a calibration system ("calibration unit") 110 in accordance with at least one embodiment of the present disclosure that pools calibration resources between one or more communication links or bus links, including, by way of non-limiting example, one or more bus lines or bus instances 140a, 140b . . . 140n as illustrated in FIG. 1. In one embodiment, the calibration unit 110 provides a solution to reconfigure and reuse the common calibration operations that are implemented simultaneously in a multi-thread calibration process with one or more different high-speed IO bus or communication link instances, such as bus instances 140a, 140b . . . 140n. The common calibration unit (CCU) 110 includes a calibration engines pool (CEP) 110a, a calibration engines pool control layer (CCL) 110b, and a link calibration interface (LCI) 135. In one embodiment, the calibration engines pool 110 has one or more calibration engines or engine clusters 111a, 111b, 111c . . . 111n, each of which is associated with a single type of calibration operation, e.g. an offset operation 112a . . . 112n, an amplitude adjustment operation (AMP) 113a . . . 113n, a CTLE operation 114a . . . 114n, and a VGA operation 115a . . . 115n. Accordingly, pursuant to at least one embodiment, each calibration engine cluster or pool contains one type of calibration engine, such as CTLE, DFE, AMP, latch offset, etc. In one embodiment, the number of engines in each calibration engine cluster may be different depending on the requirement of a particular system or systems. In one embodiment, as shown and described herein, one or more bus lines share a first common calibration pool that is associated with a common calibration pool, and another one or more bus lines can share a second common calibration operation that is distinct from the first operation also associated with the common calibration pool, and so on. The calibration pool is called a common calibration pool, in one embodiment, because it facilitates calibration of one or more operations common to at least two communication links.

Figure 4:
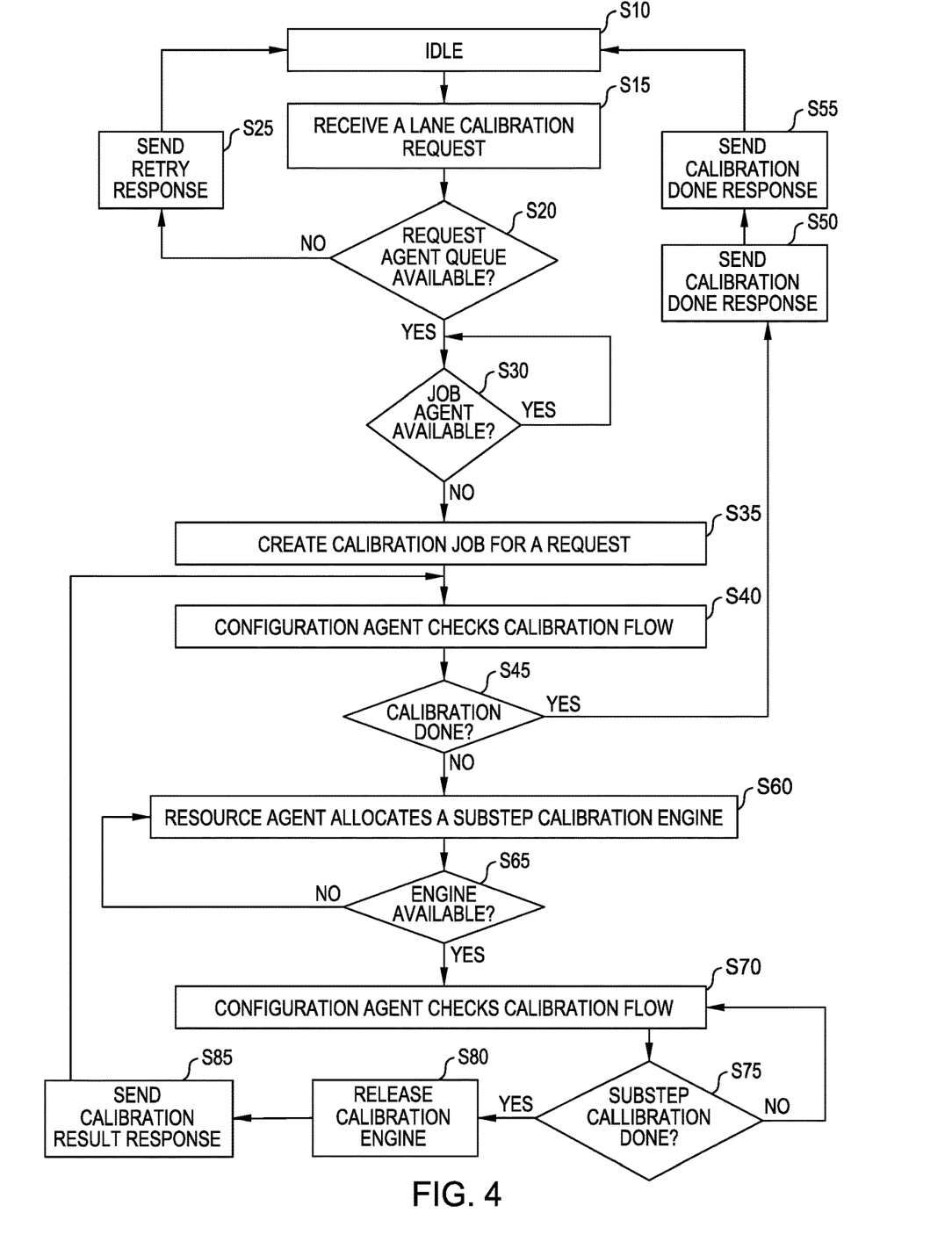
FIG. 4 illustrate a method for pooling operations for calibration according to at least one embodiment of the present disclosure.

The common calibration unit 110 further includes a calibration engines control layer or unit 110b, which in turn includes one or more agents for facilitating calibration activity, where the one or more agents are described in further detail in FIG. 4. In one embodiment, the calibration engines control layer 110b governs i) the communication between IO physical logic in one or more of the bus instances and the calibration engines pool 110a, ii) the calibration resources management and allocation, and iii) the calibration process execution.

The LCI 135 facilitates communication between the common calibration unit 110 and the one or more communication links, e.g. 140a. In one embodiment, a request packet from IO physical logic associated with one or more communication links, e.g. 140a, is received and decoded by LCI 135, which also simultaneously encodes and sends one or more response packets from the calibration engines pool control layer 110b to IO physical logic. In one embodiment, data is also transferred from the communication link to the data pipe (described in further detail below) of the CCL 110b by the LCI 135.

Figure 3:
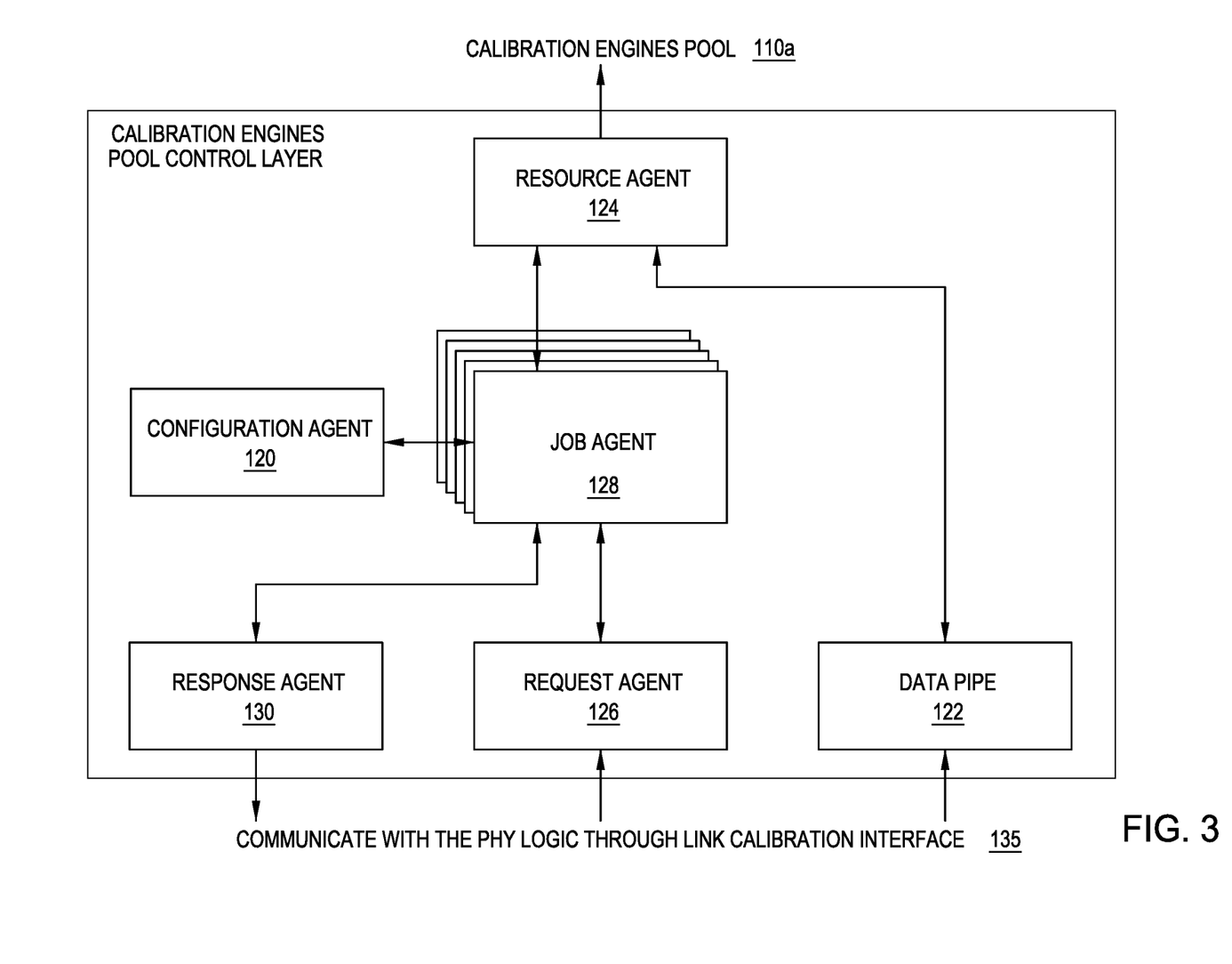
FIG. 3 illustrates one or more modules and a system for enabling and performing calibration, each of which is according to at least one embodiment of the present disclosure.

FIG. 3 illustrates a more detailed overview of the agents contained in the CCL 110b. In one embodiment, the CCL 110b facilitates calibration engines resource management, job agent resource management, and calibration flow configuration. In one embodiment, the CCL 110b includes at least six modules, e.g. a configuration agent 120, a data pipe 122, resource agent 124, a request agent 126, a job agent(s) 128, and a response agent 130. The modules can be hardware or computer programmable code specifically configured to perform one or more tasks and executed on a computer processor and/or the modules themselves can also be programmable or physical logic configured to operate as described herein. In one embodiment, the request agent 126 handles a request from IO physical logic associated with one or more communication links and the response agent 130 handles the CCL's 110b response to the request. In one embodiment, calibration process jobs are created and managed by one or more job agents 128. The resource agent 124 preforms resource checking for a particular module, allocation of a job agent 128 or other tasks associated with one or more modules, and samples data (from the data pipe 122). In one embodiment, the configuration agent 120 processes the calibration flow (and the configuration of the calibration flow) for one or more buses, links, or modules. As shown in FIG. 3, and indicated elsewhere herein, the response agent 130, the request agent 126, and the data pipe 120 interface with the LCI 135 to facilitate their respective operations and communicate with the one or more bus lines or communication links. In one embodiment, during calibration flow, the data pipe 120 provides a tunnel transporting sample data from an analog part of IO physical logic for a particular communication link (bus) to calibration engines in the pool.

FIG. 4 illustrates at least one type of process flow and/or method executed by using the common calibration unit 110 and its various components. In one embodiment, the process begins at s10 where the calibration system is in an idle state. In s15, a lane calibration request is sent to the request agent 126 from one or more of the IO physical logic(s) of a communication link (s) or bus instance(s) (via the LCI 135), and the request agent 126 checks whether a request queue 127 is available to accept the one or more requests. If the request queue 127 is full, then, as indicated in s20, the request agent 126 sends, via the response agent 130, a retry response (via the LCI 135) to the physical logic of the bus making the request so that the physical logic keeps sending request(s) until the request queue 127 is available. In one embodiment, the request is pushed into a request queue following a first in first out service model. In step s20, if the response queue is open, the response agent 130 sends a request for a job agent 128 associated with a particular type calibration process along the relevant communication link. If the job agent 128 is available, as shown in s30, the job agent is allocated by the configuration agent 120 to create a calibration job for the request, as shown in s35.

In one embodiment, the job agent 128 determines the configuration of the calibration flow with the configuration agent 120 and in accordance with the request made by the particular communication link or bus making the request at issue. If a job agent 128 is not available, as shown in s30, the request agent 126 keeps sending the request until the job agent 128 is available or created. In one embodiment, the specified job agent 128 is available at least in part if the resource engine 124 determines that the relevant calibration operation, e.g. the one associated with the request made by the bus line, in the relevant calibration engines pool is available for use, and then the configuration agent 120 facilitates the calibration for the specified operation using the relevant pool. In s40, the configuration agent 120 checks the calibration flow for the particular bus link making the request, e.g. the configuration agent determines if the particular bus line at issue requires additional calibration for other operations along the line. For example, the configuration agent 128 may have facilitated a VGA calibration, but the bus line may then require a CTLE operation to be calibrated along the line. As such, as shown in s45, if the configuration agent 128 determines further calibration is not required, then the flow proceeds to s50, where the job agent 128 and associated calibration operation are released and, as shown in s55, a "calibration done" response is sent by the response agent 130 (via the LCI 135) to the logic of the requesting bus line indicating that calibration is completed.

As shown in s45, if the configuration agent 128 determines that further calibration is required, then the resource agent 124 checks the relevant calibration engines pool for free sub-step calibration engines, e.g. the next engine required for calibrating the next operation along the line. If the required sub-step calibration engine is available, as shown in s60, the resource agent immediately allocates a specified engine resource to the job agent 128 and marks the calibration engine occupied. If all required calibration engine(s) are occupied in the pool, as shown in s65, the job agent 128 continually polls the resource agent 124 until the required engine resource becomes available. If the relevant calibration engine(s) are available, then as shown in s70, the relevant sub-step calibration is executed.

In one embodiment, as shown in s75, the job agent 128 determines whether or not the sub-calibration process is completed by continuous polling of the resource agent 124. If the job agent 128 determines sub-calibration has ended, as shown in s80, it marks the relevant calibration engine as available through the resource agent 124, and instructs the response agent 130 to send a calibration result to the physical logic of the associated communication link making the request. Once this is completed, the job agent 128 returns to process s40, determines the status of the calibration flow, and starts the next sub-step in the same manner until all calibration sub-steps are done.

As above, once all the associated calibration jobs for one or more job agents 128 are completed, the one or more job agents 128 are released, as shown in s50 and a "calibration done" response is sent via the response agent 130 to the IO physical logic of the applicable communication link (bus). In one embodiment, all job agents 128 can process the calibration requests from the IO physical logic of more than one communication link (bus) simultaneously, and job agent resources and calibration engine resources can be dynamically allocated and released to obtain the highest utility ratio possible.

Figure 5:
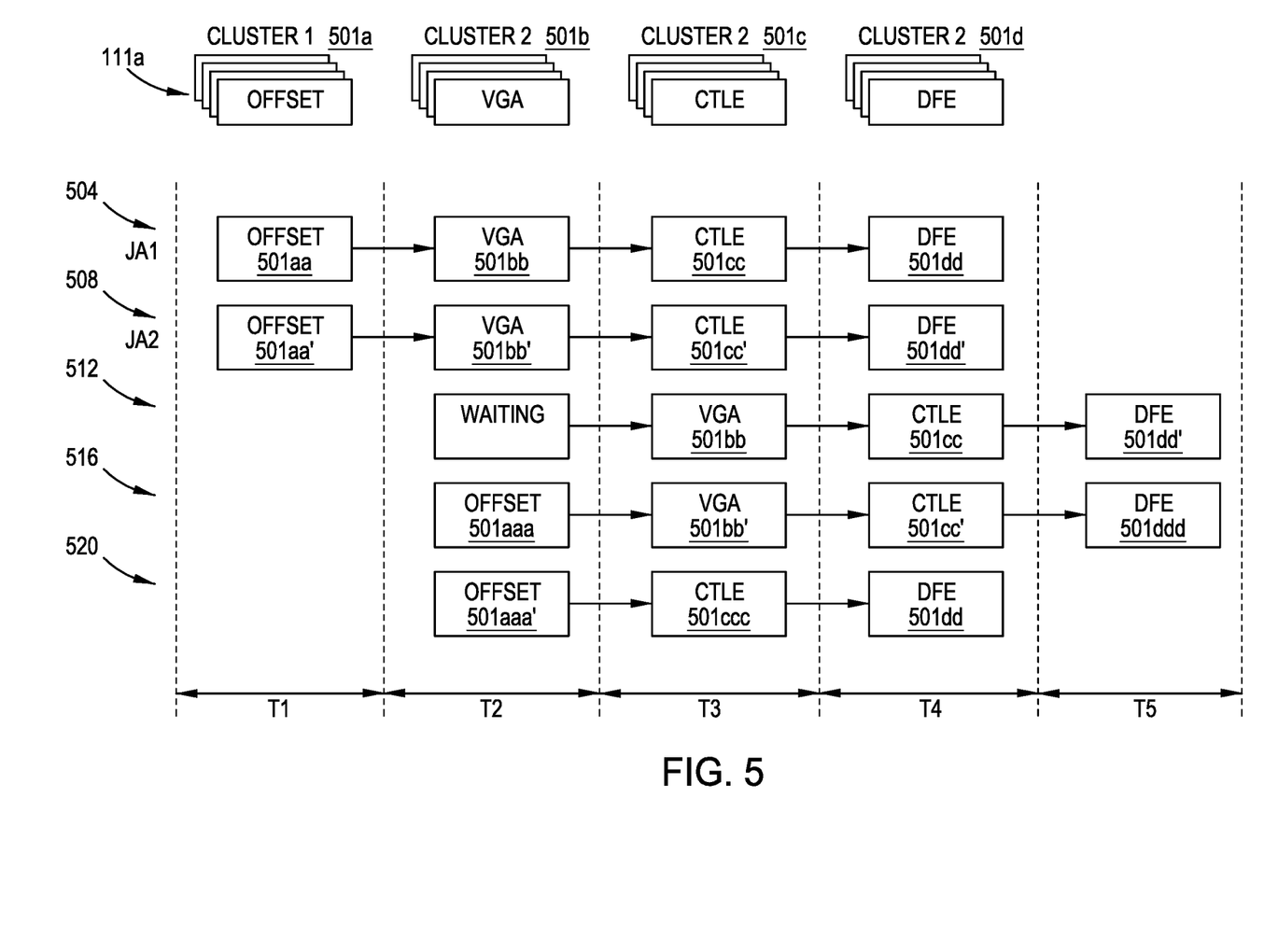
FIG. 5 illustrate a calibration scheme in accordance with at least one embodiment of the present disclosure.

FIG. 5 demonstrates an example of a calibration scheme that can be created using one or more techniques of the present disclosure. In one embodiment, one or more clusters 501a, 501b, 501c, and 501d of calibration engines that are part of a calibration pool are provided. Each cluster is associated with a specific operation, Offset, VGA, CTLE, etc. There are one or more communication links or bus lines 504, 508, 512, 516, and 520 that have more than one calibration requirement, which can be accomplished by an engine pulled from the relevant cluster, e.g. 501aa, 501bb, 501cc, and so forth. One or more job agents (JA1 ... JA5) created and assigned pursuant to at least one embodiment of the present disclosure is provided and corresponds to each one of the one or more communication links. For illustrative purposes only, time segments T1-T4 are shown with respect to segments of the bus line to indicate the calibration operation flow, although practically speaking, in at least in embodiment, division/multiplex functionality is provided and the job agents can access the relevant calibration engine clusters and operations simultaneously. As shown, the number of job agents exceeds the number of engines in each individual cluster, which can substantially reduce the cost, processing time, and power consumption associated with parallel calibration, in the aggregate, for the one or more communication links. In one embodiment, as illustrated along link 512, it is possible for all the engines associated with a particular operation and engine cluster to be fully utilized, e.g. JA1 and JA2 fully utilize all of the VGA engine of cluster 501b at a time where JA3 is also polling for use of an engine to calibrate for a VGA module/operation. In this instance, JA3 will poll a relevant resource agent until a VGA engine is released, and then it will utilize it appropriately. Although resource exhaustion can occur, this kind of overlap is unlikely to be the predominant scenario in a particular processing scenario, and as such, according to one or more embodiments of the present disclosure, substantial cost, power, and time savings still persist as a parallel calibration is executed on one or more systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   one or more physical logic units each associated with two or more communication links, wherein the one or more physical logic units are configured to create a plurality of calibration engine clusters corresponding to one or more common calibration operations required along the two or more communication links; and
   a calibration unit configured i) to interface with the two or more communication links and ii) to calibrate according to the one or more common calibration operations using the plurality of calibration engine clusters.

2. The system of claim 1, wherein the calibration unit comprises:
   a calibration engines pool containing the plurality of calibration engine clusters;
   a calibration control layer for facilitating the calibration according to the one or more common calibration operations using the plurality of calibration engine clusters; and
   a link calibration interface for interfacing between the two or more communication links and the calibration unit.

3. The system of claim 2, wherein the calibration control layer comprises:
   a request agent configured to receive one or more job agent requests from the two or more communication links, wherein the one or more job agent requests correspond to at least one of the one or more common calibration operations; and
   a configuration agent for creating one or more job agents each associated with the one or more common calibration operations, wherein the one or more job agents retrieve one or more calibration resources from the plurality of calibration engine clusters and corresponding to the at least one of the one or more common calibration operations.

4. The system of claim 3 further comprising:
   a resource agent configured to query the plurality of calibration engine clusters to determine if the one or more calibration resources are available to perform calibration; and
   a data channel configured to communicate with the resource agent and the two or more communication links.

5. A computer program product for calibrating each one of one or more common digital operations, wherein the one or more common digital operations are common to two or more communications links in a computing environment, the computer program product comprising:
   a computer-readable storage medium having computer-readable program code embodied therewith, the computer-readable program code executable by one or more computer processors to:
   create a common calibration pool for performing a calibration operation for two or more communication links, wherein the calibration operation is common to the two or more communication links; and perform a calibration on each of the two or more communication links using the common calibration pool by:
receiving a calibration request associated with the common calibration operation via a link calibration interface, wherein the calibration request is from at least one of the two or more communication links;
upon determining a calibration agent is available to handle the calibration request, retrieving a calibration engine from at least one of a plurality of calibration engine clusters corresponding to the calibration operation; and
performing the calibration operation based on the retrieving of the calibration engine.

6. The computer program product of claim 5, wherein the computer-readable program code is further executable to:
create the plurality of calibration engine clusters, each calibration engine cluster containing an engine for performing the calibration operation.

7. The computer program product of claim 6, wherein the computer-readable program code is further executable to:
establish communication between the common calibration pool and the two or more communications links via the link calibration interface.

8. The computer program product of claim 7, wherein each one of the calibration engine clusters is associated with a single and unique calibration operation in relation to one another.

9. The computer program product of claim 5, wherein the computer-readable program code is further executable to:
simultaneously perform the calibration operation based on the retrieving of the calibration engine and perform another calibration operation that is common to another two or more of the communication links using the common calibration pool, wherein the another calibration operation is distinct from the calibration operation.

10. The computer program product of claim 5, wherein the computer-readable program code is further executable to:
determine whether the calibrating of the calibration operation is complete; and
upon determining the calibrating of the calibration operation is complete, release the calibration agent for additional use by another one of the two or more communication links.

11. The computer program product of claim 5, wherein the computer-readable program code is further executable to:
determine whether the calibrating of the calibration operation is complete; and
upon determining the calibrating of the calibration operation is complete, determine whether further calibration is required for another calibration operation associated with the at least of one of the two or more communication links.

12. The computer program product of claim 11, wherein the computer-readable program code is further executable to:
if further calibration is required for the another calibration operation associated with the at least one of the two or more communication links, perform the another calibration operation using another calibration agent.

13. A method comprising:
creating a common calibration pool for performing a calibration operation for two or more communication links, wherein the calibration operation is common to the two or more communication links; and
performing a calibration on each of the two or more communication links using the common calibration pool by:
receiving a calibration request associated with the calibration operation via a link calibration interface, wherein the calibration request is from at least one of the two or more communication links;
upon determining a calibration agent is available to handle the calibration request, retrieving a calibration engine from at least one of a plurality of calibration engine clusters corresponding to the calibration operation; and
performing the calibration operation based on the retrieving of the calibration engine.

14. The method of claim 13, wherein the creating the common calibration pool for performing the calibration operation along the two or more communication links further comprises:
creating the plurality of calibration engine clusters, each calibration engine cluster containing an engine for performing the calibration operation.

15. The method of claim 13 further comprising:
establishing communication between the common calibration pool and the two or more communications links via the link calibration interface.

16. The method of claim 14, wherein each one of the calibration engine clusters is associated with a single and unique calibration operation in relation to one another.

17. The method of claim 14 further comprising:
simultaneously performing the calibration operation based on the retrieving of the calibration engine and performing another calibration operation that is common to another two or more of the communication links using the common calibration pool, wherein the another calibration operation is distinct from the calibration operation.

18. The method according to claim 13 further comprising:
determining whether the calibrating of the calibration operation is complete; and
upon determining the calibrating of the calibration operation is complete, releasing the calibration agent for additional use by another one of the two or more communication links.

19. The method according to claim 13 further comprising:
determining whether the calibrating of the calibration operation is complete; and
upon determining the calibrating of the calibration operation is complete, determining whether further calibration is required for another calibration operation associated with the at least of one of the two or more communication links.

20. The method according to claim 19 further comprising:
upon determining further calibration is required for the another calibration operation associated with the at least one of the two or more communication links, performing the another calibration operation using another calibration agent.

\* \* \* \* \*